(12) United States Patent
Ye et al.

(10) Patent No.: US 10,942,403 B2
(45) Date of Patent: Mar. 9, 2021

(54) DISPLAY SUBSTRATE AND DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Chengzhi Ye, Beijing (CN); Binbin Cao, Beijing (CN); Hui An, Beijing (CN); Fangfang Li, Beijing (CN); Hengbin Li, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/537,895

(22) Filed: Aug. 12, 2019

(65) Prior Publication Data
US 2020/0117028 A1   Apr. 16, 2020

(30) Foreign Application Priority Data
Oct. 16, 2018   (CN) .......................... 201821677836.5

(51) Int. Cl.
*G02F 1/1362* (2006.01)
*G02F 1/1343* (2006.01)

(52) U.S. Cl.
CPC .. *G02F 1/136227* (2013.01); *G02F 1/134363* (2013.01); *G02F 1/136286* (2013.01); *G02F 2001/134372* (2013.01)

(58) Field of Classification Search
CPC ......... G02F 1/136227; G02F 1/136286; G02F 1/134363; G02F 2001/134372
See application file for complete search history.

(56) References Cited

U.S. PATENT DOCUMENTS

| | | | |
|---|---|---|---|
| 2012/0057110 A1* | 3/2012 | Ishiguro ............ | G02F 1/136227 349/106 |
| 2014/0209915 A1* | 7/2014 | Park ..................... | H01L 27/1248 257/72 |
| 2015/0116623 A1* | 4/2015 | Tomioka ........... | G02F 1/134363 349/43 |
| 2015/0129881 A1* | 5/2015 | Kong .................. | H01L 27/1288 257/72 |
| 2015/0228675 A1* | 8/2015 | Takanishi ............. | G02F 1/1368 257/43 |
| 2016/0274401 A1* | 9/2016 | Huang ................. | G02F 1/1337 |
| 2018/0026081 A1* | 1/2018 | Lee .................... | G02F 1/134309 349/46 |
| 2018/0046045 A1* | 2/2018 | Chen ................. | G02F 1/136259 |

FOREIGN PATENT DOCUMENTS

WO   WO-2017133097 A1 *  8/2017   ....... H01L 29/78633

* cited by examiner

*Primary Examiner* — Jia X Pan
(74) *Attorney, Agent, or Firm* — Brooks Kushman P.C.

(57) ABSTRACT

A display substrate and a display apparatus are provided. The display substrate includes a film layer and a blocking structure. The film layer includes a via surrounded by the blocking structure. The blocking structure is at an edge of the via.

4 Claims, 4 Drawing Sheets

DISPLAY SUBSTRATE AND DISPLAY APPARATUS

CROSS-REFERENCE TO RELATED APPLICATION

This application claims priority to Chinese Patent Application No. 201821677836.5 filed on Oct. 16, 2018, which is incorporated herein by reference in its entirety.

TECHNICAL FIELD

The present disclosure relates to the display technology field, and in particular, to a display substrate and a display apparatus.

BACKGROUND

In the related art, a planarization layer is generally formed in a display device to ensure a good performance of the display device, and the planarization layer is formed on a plurality of patterns in different layers having thickness differences to generate a plat surface.

SUMMARY

Some embodiments of the present disclosure provide a display substrate which includes a film layer and a blocking structure. The film layer includes a via surrounded by the blocking structure. The blocking structure is at an edge of the via.

In some embodiments of the present disclosure, the blocking structure includes at least one circular groove.

In some embodiments of the present disclosure, the display substrate further includes a base substrate, the blocking structure includes one circular groove, and the circular groove has a depth in a direction perpendicular to the base substrate, greater than or equal to 0.2 µm and less than or equal to 0.4 µm, and has a width in a direction perpendicular to an extending direction of the circular groove, greater than or equal to 0.8 µm and less than or equal to 1 µm.

In some embodiments of the present disclosure, the blocking structure includes a plurality of circular grooves sequentially nested.

In some embodiments of the present disclosure, a distance between the via and one circular groove of the plurality of circular grooves closest to the via, in a direction perpendicular to an extending direction of the circular groove, is greater than or equal to 0.8 µm and less than or equal to 1.2 µm.

In some embodiments of the present disclosure, the display substrate further includes a base substrate. At least one circular groove of the plurality of circular grooves has a depth in a direction perpendicular to the base substrate greater than or equal to 0.2 µm and less than or equal to 0.4 µm, and has a width in a direction perpendicular to an extending direction of the at least one circular groove, greater than or equal to 0.8 µm and less than or equal to 1 µm.

In some embodiments of the present disclosure, the blocking structure includes at least one circular wall pattern.

In some embodiments of the present disclosure, the film layer is configured to be integrated with the at least one circular wall pattern.

In some embodiments of the present disclosure, the display substrate further includes a base substrate, the blocking structure includes one circular wall pattern, and the circular wall pattern has a height in a direction perpendicular to the base substrate greater than or equal to 0.3 µm and less than or equal to 0.5 µm, and has a width in a direction perpendicular to an extending direction of the circular wall pattern, greater than or equal to 0.8 µm and less than or equal to 1 µm.

In some embodiments of the present disclosure, the blocking structure includes a plurality of circular wall patterns sequentially nested.

In some embodiments of the present disclosure, the display substrate further includes a base substrate, and at least one circular wall pattern of the plurality of circular wall patterns has a height in a direction perpendicular to the display substrate greater than or equal to 0.3 µm and less than or equal to 0.5 µm, and has a width in a direction perpendicular to an extending direction of the at least one circular wall pattern, greater than or equal to 0.8 µm and less than or equal to 1 µm.

In some embodiments of the present disclosure, the film layer includes an organic film.

Some embodiments of the present disclosure provide a display apparatus, which includes any one of the above display substrate.

In some embodiments of the present disclosure, the blocking structure includes at least one circular groove.

In some embodiments of the present disclosure, the blocking structure includes a plurality of circular grooves sequentially nested.

In some embodiments of the present disclosure, the blocking structure includes at least one circular wall pattern.

In one or more embodiments of the present disclosure, the blocking structure includes a plurality of circular wall patterns sequentially nested.

BRIEF DESCRIPTION OF DRAWINGS

The drawings described herein are used to illustrate this disclosure, and are merely a part of this disclosure. The illustrative embodiments of the present disclosure and the description thereof are for explaining the present disclosure and should not be construed to unduly limit this disclosure.

DETAILED DESCRIPTION

A display substrate and a display apparatus provided in some embodiments of the present disclosure will be described below in conjunction with the drawings.

The planarization layer is formed on a plurality of patterns in different layers having thickness differences in the display device to generate a plat surface. Since the planarization layer has a large thickness, a via formed in the planarization layer has a large deep in a thickness direction of the planarization. Defects are likely to occur at the via in the following process of manufacturing other film layers, which affects the production yield of the display device.

In some conditions, an organic film layer serving as the planarization layer is formed in the display substrate, and the fabricating process of the display substrate is as follows.

Figure 1:
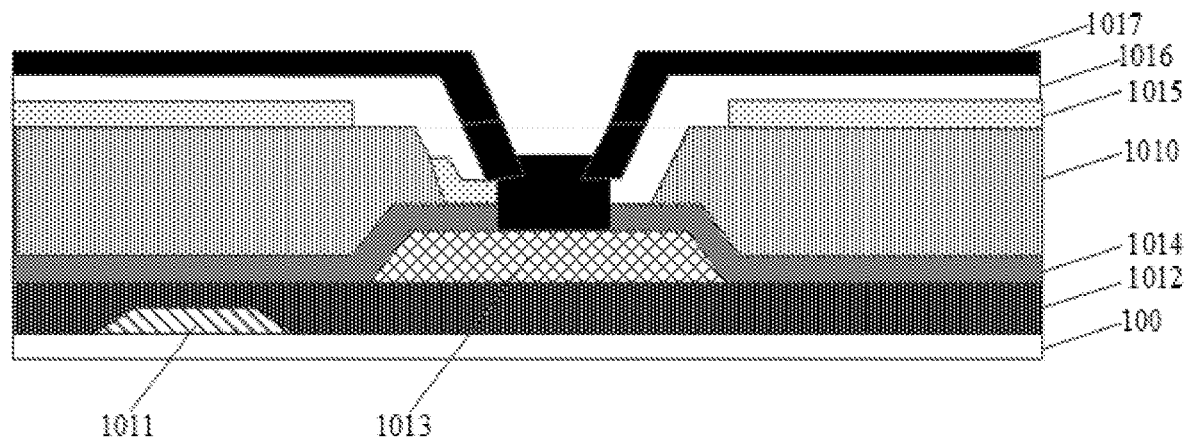
FIG. 1 is a schematic diagram of a display substrate according to the related art.

As shown in FIG. 1, a gate layer 1011, a gate insulation layer 1012, a data line layer 1013 and a buffer layer 1014 are sequentially formed on a base substrate 100. An organic film layer 1010 is formed on the buffer layer 1014. The organic film layer 1010 is provided with a first via (an orthogonal projection of the first via on the base substrate 100 is within an orthogonal projection of the data line layer 1013 on the base substrate 100). A first transparent electrode layer 1015, a passivation layer 1016 and a second transparent electrode layer 1017 are sequentially formed on the organic film layer 1010.

In some display substrates, the first transparent electrode layer 1015 is a common electrode layer, and the second transparent electrode layer 1017 is a pixel electrode layer.

Figure 2:
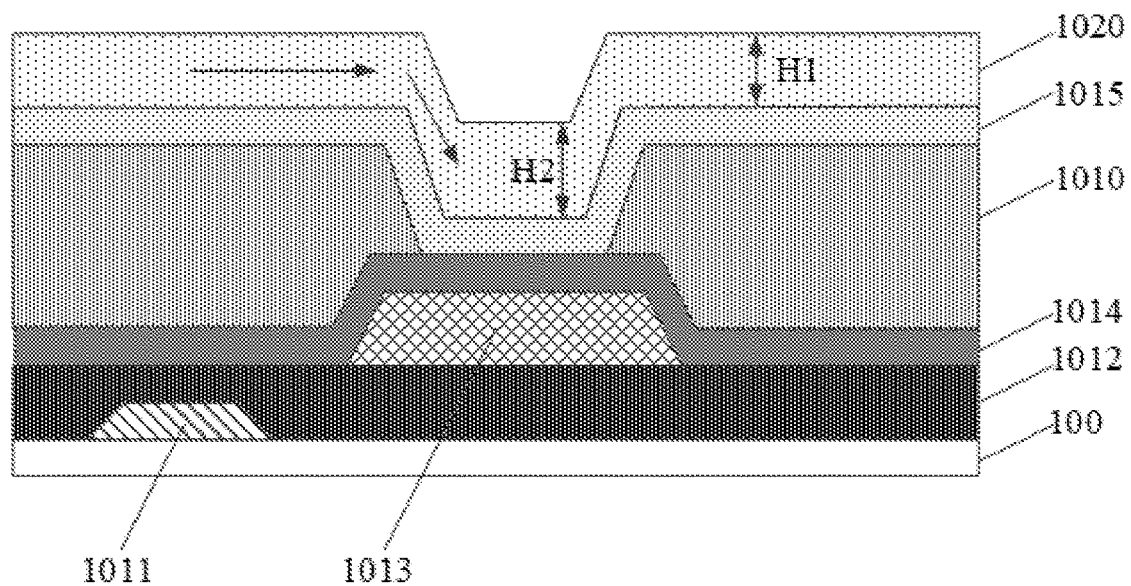
FIG. 2 is a schematic diagram of the display substrate according to the related art.
Figure 3:
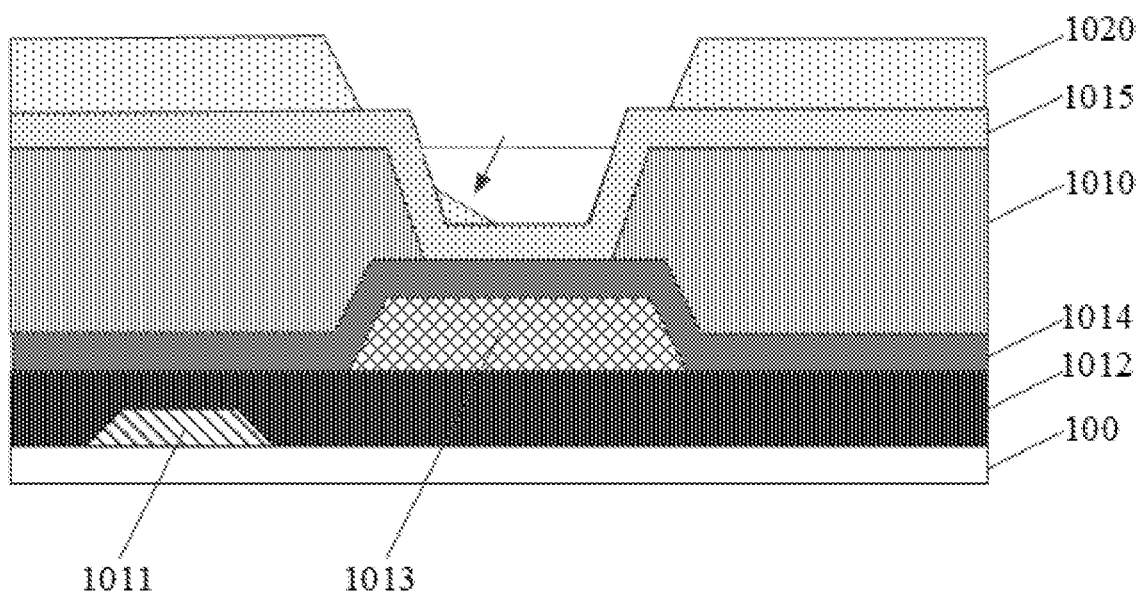
FIG. 3 is an another schematic diagram of the display substrate according to the related art.
Figure 4:
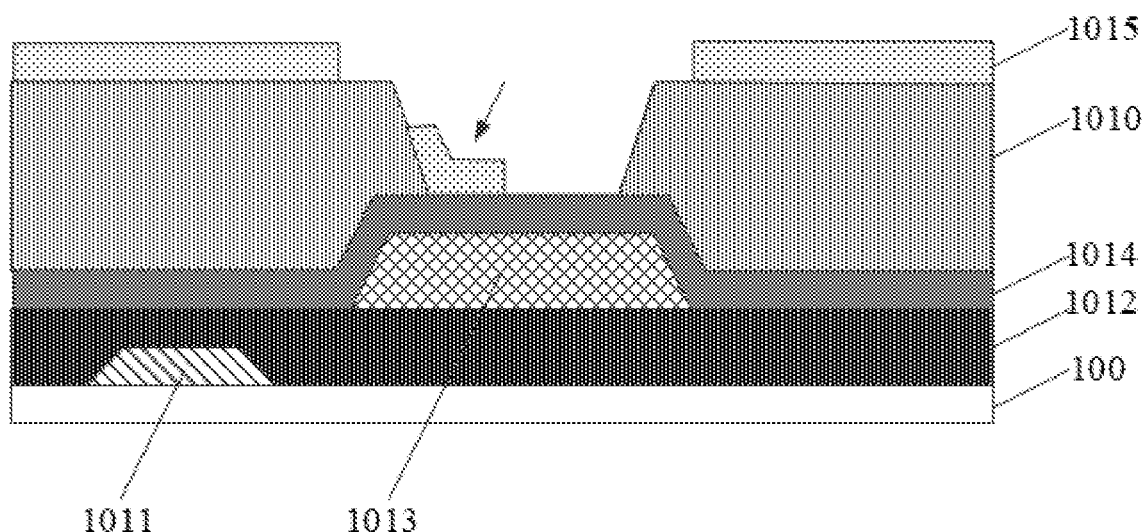
FIG. 4 is an another schematic diagram of the display substrate according to the related art.

As shown in FIG. 2 to FIG. 4, the first transparent electrode layer 1015 is formed by the following steps. A transparent thin film coating the organic film layer 1010 and the first via is formed on the organic film layer 1010. Photoresist 1020 is formed on the transparent thin film. Since a distance between a top and a bottom of the first via is large, a large amount of photoresist 1020 flows into the first via, causing that a thickness H2 of the photoresist 1020 in the first via is larger than a thickness H1 of the photoresist 1020 outside the first via. The photoresist 1020 is exposed, and a photoresist reserving region and a photoresist removing region are formed. The photoresist reserving region is a region where the first transparent electrode layer 1015 is located. The photoresist removing region is other regions except the photoresist reserving region. Since H2 is larger than H1, there will be residual photoresist 1020 (as indicated by the arrow in FIG. 3) in the first via after the photoresist 1020 is exposed and developed. Finally, the transparent thin film in the photoresist removing region is removed through an etching process.

Since a region where the first via is located corresponds to the photoresist removing region, and there is residual photoresist 1020 in the first via, the transparent thin film in the first via and covered by the residual photoresist 1020 are not removed in the etching process, leaving a residual transparent thin film (as indicated by the arrow in FIG. 4) in the first via. After the etching process, the fabrication of the first transparent electrode layer 1015 is complete. The first transparent electrode layer 1015 is located on a side of the organic film layer 1010 away from the base substrate 100, and the first transparent electrode layer 1015 is provided with a second via. An orthogonal projection of the second via on the base substrate 100 encompasses the orthogonal projection of the first via on the base substrate 100.

It can be seen from the formation of the first transparent electrode layer 1015 that since the organic film layer 1010 has a large thickness, a distance between a top and a bottom of a via formed in the organic film layer 1010 is also large. Therefore, after the first transparent electrode layer 1015 is fabricated on the organic film layer 1010, it is likely to leave residues of the transparent thin film in the first via, resulting in a defect that the data line layer 1013 and the first transparent electrode layer 1015 are short-circuited (that is, Data Control Signal (DCS) defect). The DCS defect causes signals transmitted from the data line layer 1013 to the second transparent electrode layer 1017 to be different from a normal signal. And such display substrate is applied in the liquid crystal display device, leading liquid crystal molecules in the liquid crystal display device not be driven and resulting in display failure of the liquid crystal display device.

A thick layer is formed in some display devices, a via formed in the thick layer has a large deep between a top and a bottom of the via, and accordingly, residue material of other films are likely to be left in the via, resulting in a reduction of the production yield of the display device.

Some embodiments of the present disclosure provide a display substrate. As shown in FIG. 5 to FIG. 8, the display substrate includes a film layer and a blocking structure. The film layer includes a via 21 surrounded by the blocking structure. The via 21 is in the film layer. The blocking structure is at an edge of the via 21.

In some embodiments, as shown in FIGS. 5-8, the film layer is an organic film layer.

In some embodiments, the blocking structure is a wall pattern 18 or a groove 19.

In a process of manufacturing the display substrate, the blocking structure is formed at the edge of the via 21 during the formation process of the film layer or after the film layer is formed. The blocking structure is capable of restricting material having a certain fluidity to flow into the via 21 from the edge of the via 21.

In the display substrate provided by some embodiments of the present disclosure, the blocking structure surrounding the via 21 is at the edge of the via 21. As a result, in the process that other film layer is subsequently fabricated on the film layer, the photoresist 20 on other film layer does not flow in a large amount into the via 21 from the edge of the via 21, ensuring that the thickness of the photoresist 20 located in the via 21 and the thickness of the photoresist 20 located outside the via 21 are substantially the same.

Thus, in the following exposing and developing process, there is no photoresist 20 left in the via 21. Accordingly, after the etching process, there is no material of other film layers left in the via 21, thereby well ensuring production yield of the display substrate.

The display substrate provided by the above embodiments may include various film layers. Exemplarily, the display substrate includes an organic layer 10 serving as a planarization layer in the display substrate.

The organic film layer 10 itself has characteristics of small dielectric constant, large thickness and planarization, which makes that the mutual influence between a pixel electrode (such as the second transparent electrode layer 17 in FIG. 5) and the data line layer 13 in the display substrate is weakened, thereby reducing a safety distance to be reserved between the pixel electrode and the data line layer. In this way, in a process where the display substrate and the color filter substrate are oppositely arranged to form a cell to form a display panel, an area of a black matrix disposed on the color filter substrate is reduced, thereby improving the aperture ratio of the display panel.

The parasitic capacitance generated inside the display substrate including the organic film layer 10 is also smaller than that of other display substrates not including the organic film layer 10, thereby ensuring the operational stability of the display substrate.

The blocking structure provided by the above embodiments may have various structures.

Figure 5:
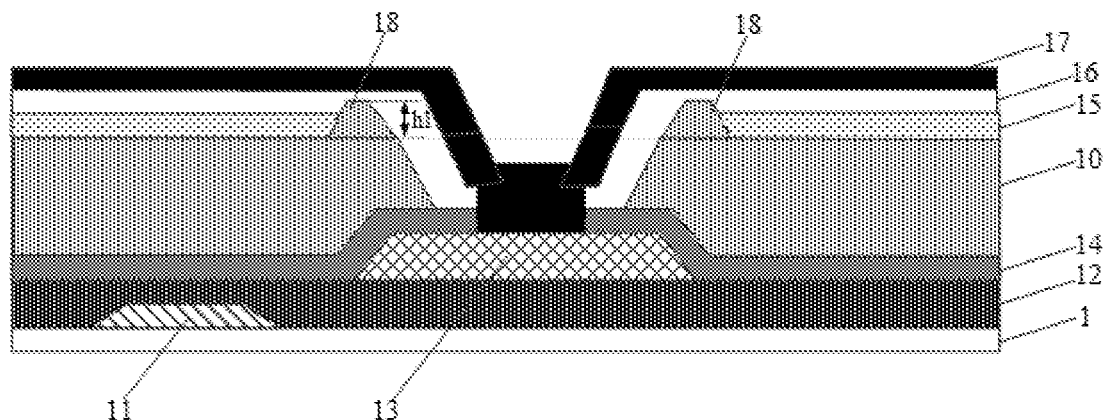
FIG. 5 is a schematic diagram of a display substrate including a wall pattern according to some embodiments of the present disclosure.
Figure 6:
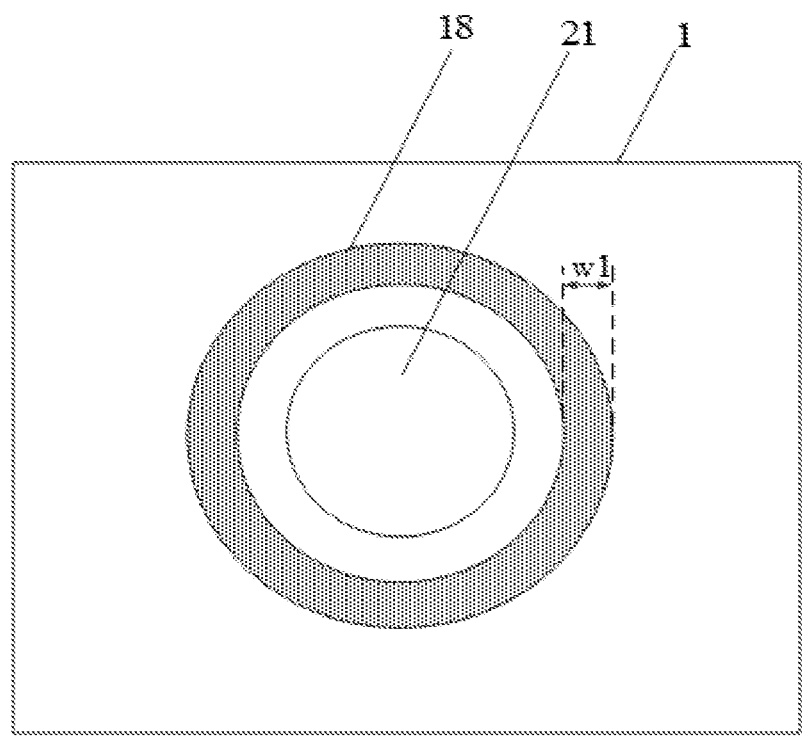
FIG. 6 is a top view of the wall pattern in FIG. 5.

As shown in FIG. 5 and FIG. 6, in some embodiments, the above blocking structure includes at least one circular wall pattern 18.

Material having a certain fluidity at the edge of the via 21 is blocked by the circular wall pattern 18, and does not flow into the inside of the via 21, thereby avoiding adverse influence caused by accumulation of a large amount of the material inside the via 21.

In some embodiments of the present disclosure, as shown in FIG. 5 and FIG. 6, the blocking structure includes one circular wall pattern 18.

In some case, the circular wall pattern 18 is placed as close as possible to the via 21.

In some embodiments of the present disclosure, the film layer includes an organic film layer 10, the first transparent electrode layer 15 is formed on the organic film layer 10, and the organic film layer 10 is provided with a first via. The first transparent electrode layer 15 is provided with a second via. An orthogonal projection of the second via on a base substrate 1 encompasses an orthogonal projection of the first via on the base substrate 1.

With the configuration that the blocking structure includes one circular wall pattern 18 and the circular wall pattern 18 is placed as close as possible to the first via, in the fabrication of the first transparent electrode layer 15, the circular wall pattern 18 is not covered by the first transparent electrode layer 15, such that the first transparent electrode layer 15 is flat.

In some embodiments, the circular wall pattern 18 and the film layer are integrated together.

With the configuration that the circular wall pattern 18 and the film layer are integral, the circular wall pattern 18 and the film layer can be formed simultaneously in one patterning process, that is, and there is no need to add an additional patterning process for forming the circular wall pattern 18, thereby simplifying the manufacturing process and reducing the production costs.

The formation of the circular wall pattern 18 is described below with an example in which the film layer includes the organic film layer 10 and the circular wall pattern 18 and organic film layer 10 are integrated together.

A whole layer of the organic film is formed. The organic film is exposed with a halftone mask to form an organic film completely reserving region, an organic film partially reserving region, and an organic film completely removing region. The organic film completely reserving region corresponds to the region where the circular wall pattern 18 is located. The organic film partially reserving region corresponds to the region where the organic film layer 10 is located. The organic film completely removing region corresponds to other regions. The exposed organic film is subjected to development so as to completely remove the organic film in the organic film completely removing region and partially remove the organic film in the organic film partially reserving region, such that the organic film layer 10 and the circular wall pattern 18 are formed.

In some embodiments, the blocking structure includes a plurality of circular wall patterns 18, and the plurality of circular wall patterns 18 is sequentially nested, and one of the plurality of circular wall patterns 18 closest to the via is configured to surround the via 21.

With the plurality of circular wall patterns 18 placed at the edge of the via 21, the blocking effect of the blocking structure restricting material from flowing into the via 21 through the edge of the film via 21 is improved, thereby avoiding adverse influence caused by accumulation of a large amount of the material inside the via 21.

In some embodiments, the display substrate includes a base substrate 1, and the circular wall pattern 18 has a height h1 in a direction perpendicular to the base substrate 1, where 0.3 µm≤h1≤0.5 µm, and has a width w1 in a direction perpendicular to an extending direction of the circular wall pattern 18, where 0.8 µm≤w1≤1 µm.

In some embodiments, the height h1 of the circular wall pattern 18 in the direction perpendicular to the base substrate 1 is 0.4 µm, and the width w1 of the circular wall pattern 18 in the direction perpendicular to its extending direction is 0.9 µm.

With configuring the circular wall pattern 18 with the above sizes, the circular wall pattern 18 not only achieves a good blocking effect but also occupies a small space without greatly changing the size of the display substrate.

Figure 7:
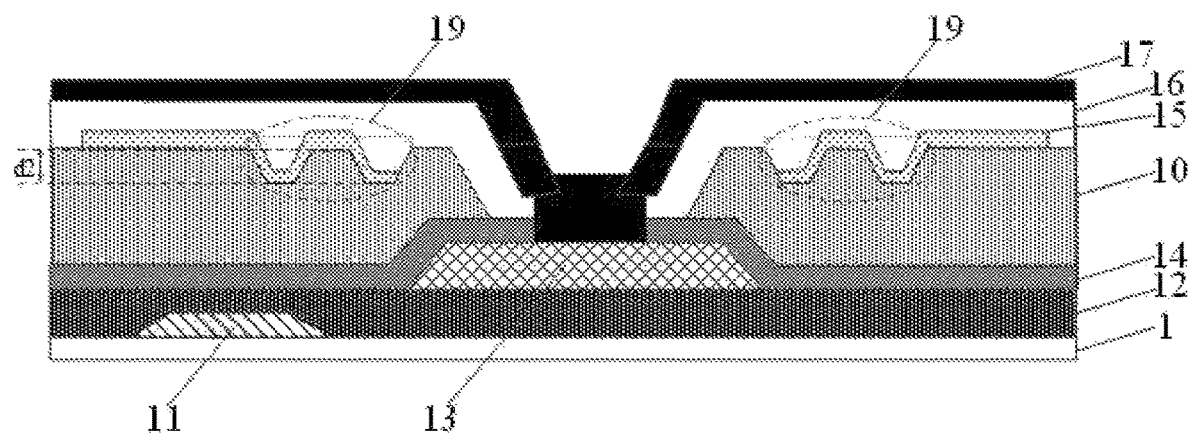
FIG. 7 is a schematic diagram of a display substrate including a groove according to some embodiments of the present disclosure.
Figure 8:
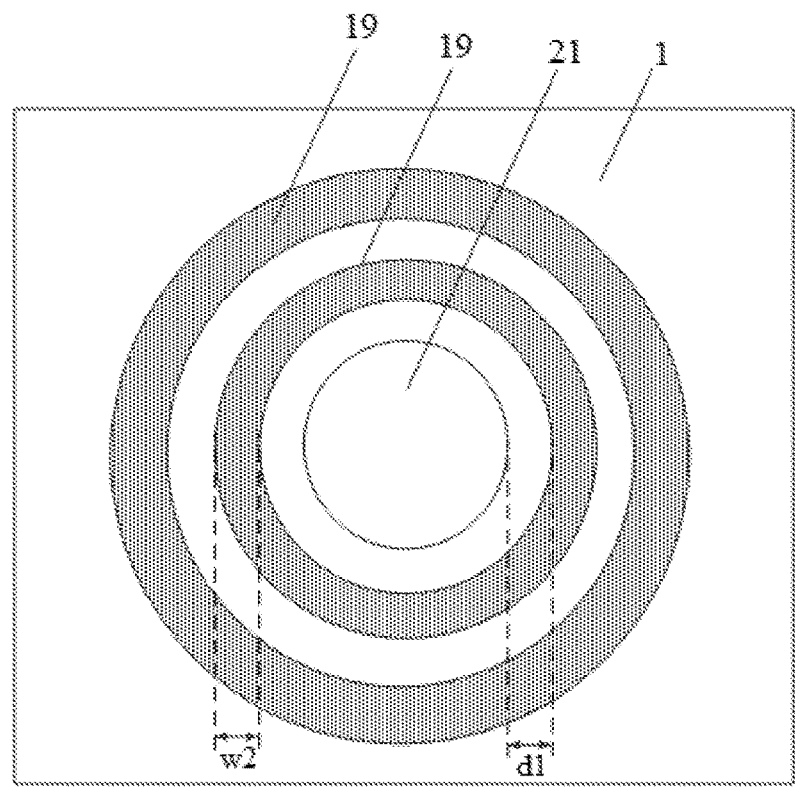
FIG. 8 is a top view of the groove in FIG. 7.

In some embodiments, as shown in FIG. 7 and FIG. 8, the blocking structure includes at least one circular groove 19.

In the case where the blocking structure includes the at least one circular groove 19, the material having a certain fluidity at the edge of the via 21 will flow into the circular groove 19 and does not easily flow into the via 21 from the edge of the via 21, thereby avoiding adverse influence caused by accumulation of a large amount of the material inside the via 21.

The formation process of the circular groove 19 is described below with an example in which the film layer includes the organic film layer 10 and the blocking structure includes at least one circular groove 19.

An organic film covering a whole layer is formed. The organic film is exposed with a halftone mask to form an organic film completely reserving region, an organic film partially reserving region, and an organic film completely removing region. The organic film completely reserving region corresponds to the region where the circular wall pattern 18 is located. The organic film partially reserving region corresponds to a region where the organic film layer 10 is located. The organic film completely removing region corresponds to other regions. The exposed organic film is subjected to development so as to completely remove the organic film in the organic film completely removing region and partially remove the organic film in the organic film partially reserving region, such that the organic film layer 10 and at least one circular groove 19 are formed.

In the fabrication of the above organic film layer 10 and the circular groove 19, the organic film layer 10 corresponds to the organic film completely reserving region and the circular groove 19 corresponds to the organic film partially reserving region, so even if the area of the formed organic film layer 10 is large, a good thickness uniformity of the organic film layer 10 can be ensured.

In some embodiments, the blocking structure includes a plurality of grooves 19 sequentially nested, and one circular groove 19, among the plurality of circular grooves 19, closest to the via 21 surrounds the via 21.

With the plurality of circular grooves 19 arranged at the edge of the via 21, the blocking effect of the blocking structure restricting material from flowing into of the via 21 through the edge of the film via 21 is improved, thereby avoiding adverse influence caused by accumulation of a large amount of the material inside the via 21.

In some embodiments, a distance between the via 21 and one circular groove 19 among the plurality of circular grooves 19 closest to the via 21, in a direction perpendicular to the extending direction of the circular groove 19, is d1, where 0.8 µm≤d1≤1.2 µm; and at least one circular groove of the plurality of circular grooves 19 has a depth d2 in the direction perpendicular to the base substrate 1 of the display substrate, where 0.2 µm≤d2≤0.4 µm, and has a width w2 in the direction perpendicular to an extending direction of the at least one circular groove, where 0.8 µm≤w2≤1 µm.

In some embodiments, the distance d1 between the via 21 and the circular groove 19, among the plurality of circular grooves 19, closest to the via 21 in the direction perpendicular to the extending direction of the circular groove 19 is 1 μm, the depth d2 of the circular groove 19 in the direction perpendicular to the base substrate 1 of the display substrate is 0.3 μm; and the width w2 of the circular groove 19 in the direction perpendicular to its extending direction is 0.9 μm.

With configuring the circular groove 19 included in the blocking structure according to the above values, the material having a certain fluidity is restricted from flowing into the via 21 from the edge of the via 21, and the circular groove 19 occupies a small space without greatly changing the size of the display substrate.

The fabrication process of the display substrate provided by some embodiments of the present disclosure is described below.

In step one, a gate layer 11, a gate insulation layer 12, an active layer, a source/drain metal layer and a data line layer 13 are sequentially formed on the base substrate 1 in which the source/drain metal layer and the data line layer 13 are in a same layer, and a buffer layer 14 is formed on the source/drain metal layer and the data line layer 13.

In step two, an organic film is formed on the buffer layer 14 though a coating process, the organic film is exposed with a halftone mask, and then the organic film after exposing is subjected to development to form the blocking structure and the organic film layer 10 with a first via.

In step three, a transparent thin film is formed on the organic film layer 10 through deposition, and photoresist 20 is coated on the transparent thin film; the photoresist 20 is subjected to exposure and development to form a photoresist reserved region and a photoresist removed region; the transparent thin film within the photoresist removed region is removed by an etching process, and the photoresist within the photoresist reserved region is removed to form the first transparent electrode layer 15 and the second via. An orthogonal projection of the second via on the base substrate 1 surrounds an orthogonal projection of the first via on the base substrate 1.

In step four, a passivation layer 16 coating the first transparent electrode layer 15, the blocking structure, the first via and the second via, is formed on the first transparent electrode layer 15; and the passivation layer 16 and the buffer layer 14 are patterned to form a third via in the passivation layer 16 and a fourth via in the buffer layer 14. The third via partially overlaps the fourth via in the direction perpendicular to the base substrate. An orthogonal projection of the third via and an orthogonal projection of the fourth via on the base substrate are both within the orthogonal projection of the first via on the base substrate.

In step five, a second transparent electrode layer 17 is formed on the passivation layer 16. The second transparent electrode layer 17 is electrically connected to the data line layer 13 through the first via, the second via, the third via, and the fourth via.

Some embodiments of the present disclosure provide a display apparatus including the display substrate in any above embodiments.

In the display substrate provided by the above embodiments of the present disclosure, the blocking structure surrounding the via 21 is arrange at the edge of the via 21, such that in the subsequent fabrication process of other film layers, the photoresist 20 disposed on other film layers will not flow in a large amount into the via 21 from the edge of the via 21, ensuring the production yield of the display substrate. Therefore, the display apparatus provided by embodiments of the present disclosure includes the above display substrate and also has the above effects, which are not repeated here.

Unless otherwise defined, any technical or scientific term used in the present disclosure shall have a common meaning understood by a person of the ordinary skill in the art to which the disclosure pertains. Such words as "first," "second," and similar terms used in the present disclosure are merely used to distinguish different components rather than to represent any order, number or importance. The word "comprising" or "comprises" or variations thereof means the element or item listed therebefore encompasses the element or item listed thereafter as well as equivalents thereof, and does not exclude other element or item. Such words "connected" or "connected to" and the like are may include electrical connection, direct or indirect, rather than to be limited to physical or mechanical connection. Such word as "on", "under", "left", "right", etc. are merely used to indicate the relative position relationship, and when an absolute position of the object to be described is changed, the relative position relationship will be changed accordingly.

It will be understood that when an element such as a layer, a film, a region or a substrate is referred to as being "on" or "below" another element, the element may be "directly" "on" or "below" another element, or an intermediate element may be present.

In the description of the above embodiments, the features, structures, materials or characteristics may be combined in any suitable manner in any one or more embodiments or examples.

The above is merely some embodiments of the present disclosure, but the scope of the present disclosure is not limited thereto. Any other modifications or substitutions easily conceived by those skilled in the art within the technical scope of the present disclosure should be covered by the scope of the disclosure. Therefore, the scope of the present disclosure should be determined by the scope of the claims.

What is claimed is:

1. A display substrate, comprising: a film layer and a blocking structure;
   wherein the film layer comprises a via surrounded by the blocking structure, and the blocking structure is at an edge of the via,
   wherein the blocking structure comprises a plurality of circular grooves sequentially nested,
   wherein a distance between the via and one circular groove of the plurality of circular grooves closest to the via, in a direction perpendicular to an extending direction of the circular groove, is greater than or equal to 0.8 μm and less than or equal to 1.2 μm.

2. The display substrate according to claim 1, further comprising: a base substrate, wherein at least one circular groove of the plurality of circular grooves has a depth in a direction perpendicular to the base substrate greater than or equal to 0.2 μm and less than or equal to 0.4 nm, and has a width in a direction perpendicular to an extending direction of the at least one circular groove, greater than or equal to 0.8 μm and less than or equal to 1 μm.

3. The display substrate according to claim 1, wherein the film layer comprises an organic film.

4. A display apparatus, comprising the display substrate according to claim 1.

* * * * *